United States Patent
Ping et al.

(10) Patent No.: US 8,499,126 B2
(45) Date of Patent: Jul. 30, 2013

(54) MEMORY CONTROL SYSTEM AND METHOD

(75) Inventors: Te-Lin Ping, Hsinchu (TW); I-Huan Huang, Tainan (TW)

(73) Assignee: Novatek Microelectronics Corp., Hsinchu (TW)

( * ) Notice: Subject to any disclaimer, the term of this patent is extended or adjusted under 35 U.S.C. 154(b) by 260 days.

(21) Appl. No.: 13/042,013

(22) Filed: Mar. 7, 2011

(65) Prior Publication Data

US 2011/0219198 A1    Sep. 8, 2011

(30) Foreign Application Priority Data

Mar. 8, 2010  (TW) ............................... 99106661 A

(51) Int. Cl.
*G06F 12/00*  (2006.01)
(52) U.S. Cl.
USPC .......................................................... 711/154
(58) Field of Classification Search
None
See application file for complete search history.

(56) References Cited

U.S. PATENT DOCUMENTS 6,182,196 B1  1/2001  DeRoo
7,734,860 B2 *  6/2010  Sakata .......................... 711/100

FOREIGN PATENT DOCUMENTS

CN          1160641 C       8/2004

* cited by examiner

*Primary Examiner* — Duc Doan
(74) *Attorney, Agent, or Firm* — Rabin & Berdo, P.C.

(57) ABSTRACT

A memory control system includes a first queue unit, a second queue unit, a first transforming unit, a second transforming unit, an arbiter and a control unit. The first queue unit temporarily stores multiple first request instructions. The second queue unit temporarily stores multiple second request instructions. The first transforming unit selectively re-assigns memory addresses corresponding to these first request instructions. The second transforming unit selectively re-assigns memory addresses corresponding to these second request instructions. The arbiter performs immediate scheduling of the first request instructions and the second request instructions to the memory. The control unit compares bandwidths of the first request instructions with bandwidths of the second request instructions, and controls the first transforming unit and the second transforming unit to perform re-assigning operations or not according to compared results.

20 Claims, 2 Drawing Sheets

MEMORY CONTROL SYSTEM AND METHOD

This application claims the benefit of Taiwan application Serial No. 99106661, filed Mar. 8, 2010, the subject matter of which is incorporated herein by reference.

BACKGROUND OF THE INVENTION

1. Field of the Invention

The invention relates in general to a memory control system and a memory control method, and more particularly to a memory control system and a memory control method capable of optimizing the memory usage performance.

2. Description of the Related Art

When data are written to or read from a memory, many steps including activating, instruction writing/reading and pre-charging have to be sequentially performed so that the data can be accessed. The request instructions for different sources have different methods for accessing the memory. In a display controller of a television system, for example, the display controller is for displaying video frames, and the display request instructions thereof shown in FIG. 1 correspond to the line-by-line data access to the memory. The data accessed according to the display request instructions for the line-by-line access in the memory are continuous, so the data access may be a pipeline access to achieve the best memory bandwidth availability.

In addition, taking the video decoder as an example, its decoding request instructions are shown in FIG. 2 and correspond to the block data access to the memory. However, the decoding request instructions corresponding to the block access may have the phenomenon that the page address is not hit but the bank address is hit when the memory addresses are switched. Thus, the pipeline method cannot be adopted to hide the activating instructions, thereby decreasing the performance, and the best memory bandwidth availability cannot be achieved. Thus, a tiling mechanism is disclosed. In the tiling mechanism, the memory addresses are mapped again so that the addresses of the data of the memory accessed by the video decoder are continuous although the memory is accessed with the block serving as one unit. Thus, the condition that the page address is not hit can be significantly reduced, and the memory bandwidth availability can be enhanced.

However, the television system available in the market usually contains a display controller and a video decoder. That is, two memory access methods including the line-by-line access and the block access do exist in the single system. Consequently, if the line-by-line access is adopted, then the memory accessing performance of the video decoder becomes poor. If the tiling mechanism is adopted to map the memory addresses again, then the memory accessing performance of the display controller becomes poor. That is, in the conventional memory access technology, the system including two memory access methods cannot achieve the best memory bandwidth availability.

SUMMARY OF THE INVENTION

The invention is directed to a memory control system and a memory control method, which utilize a classification queue to collect the same type of request instructions, and correspond to the independent transforming mechanism according to the requirement so that the object of optimizing the overall system performance can be achieved.

According to a first aspect of the present invention, a memory control system including a first queue unit, a second queue unit, a first transforming unit, a second transforming unit, an arbiter and a control unit is provided. The first queue unit temporarily stores a plurality of first request instructions, which corresponds to a line-by-line access to a memory. The second queue unit temporarily stores a plurality of second request instructions, which corresponds to a block access to the memory. The first transforming unit selectively re-assigns memory addresses corresponding to the first request instructions. The second transforming unit selectively re-assigns memory addresses corresponding to the second request instructions. The arbiter, coupled to the first transforming unit and the second transforming unit, performs immediate scheduling of the first request instructions and the second request instructions to the memory. The control unit compares bandwidths of the first request instructions with bandwidths of the second request instructions, and controls the first transforming unit and the second transforming unit to perform re-assigning operations or not according to compared results.

According to a second aspect of the present invention, a memory control method is provided. The method includes the following steps. First, a first queue unit is utilized to temporarily store a plurality of first request instructions, which corresponds to a line-by-line access to a memory. Next, a second queue unit is utilized to temporarily store a plurality of second request instructions, which corresponds to a block access to the memory. Then, an arbiter is utilized to perform immediate scheduling of the first request instructions and the second request instructions to the memory. Next, a control unit is utilized to compare bandwidths of the first request instructions with bandwidths of the second request instructions, to control a first transforming unit to selectively re-assign memory addresses corresponding to the first request instructions, and to control a second transforming unit to selectively re-assign memory addresses corresponding to the second request instructions according to compared results.

The above and other aspects of the invention will become better understood with regard to the following detailed description of the preferred but non-limiting embodiment(s). The following description is made with reference to the accompanying drawings.

DETAILED DESCRIPTION OF THE INVENTION

The invention provides a memory control system and a memory control method utilizing a classification queue to classify different types of request instructions, so that they have individual independent address transforming mechanisms, and the address transforming mechanisms may be dynamically selected according to the requirement to achieve the object of optimizing the overall system performance.

Figure 1:
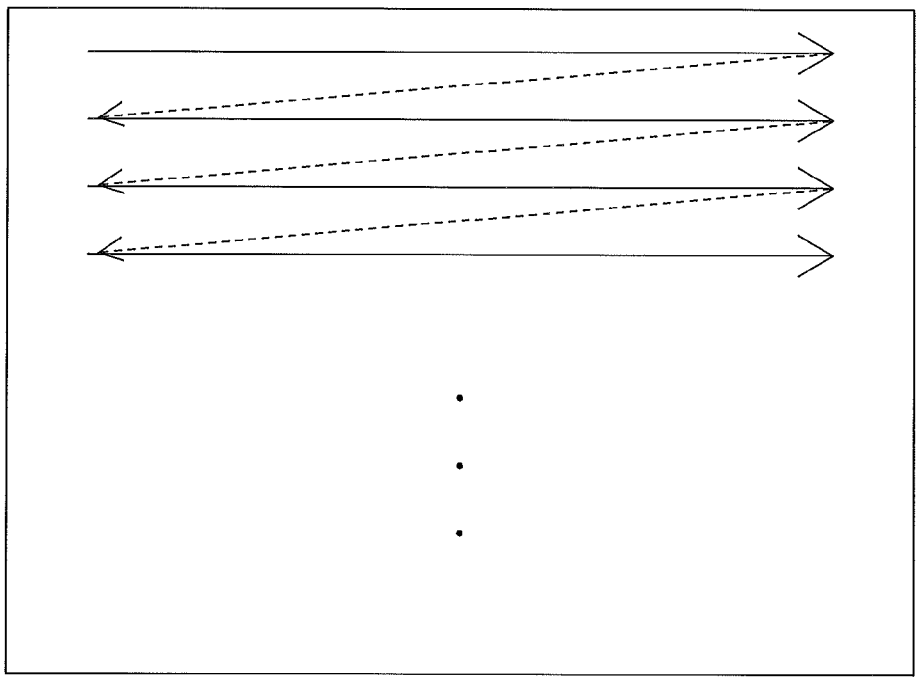
FIG. 1 (Prior Art) is a schematic illustration showing a conventional display controller, which performs a line-by-line access to a memory.
Figure 2:
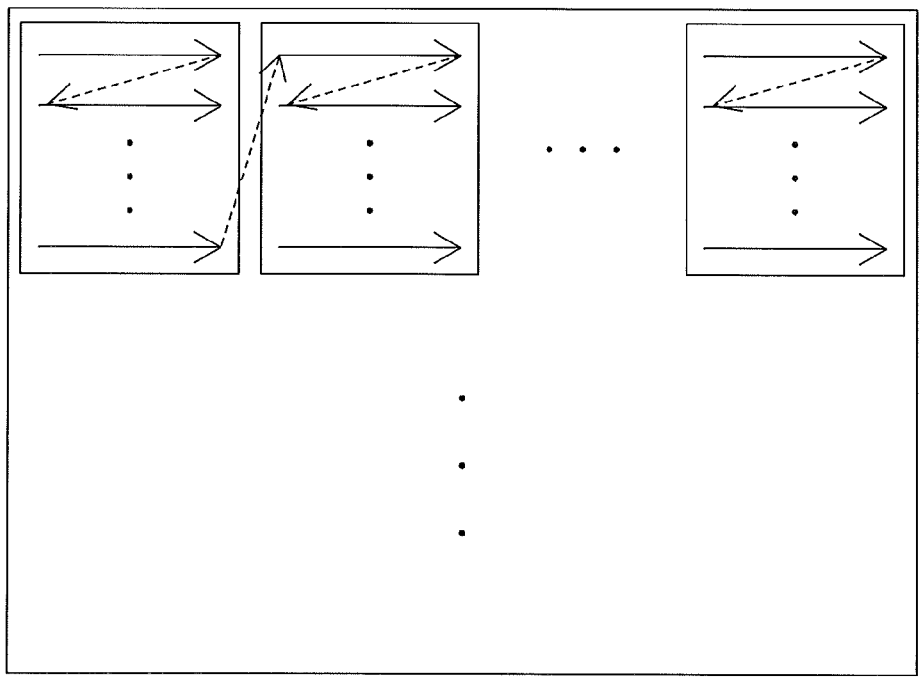
FIG. 2 (Prior Art) is a schematic illustration showing a conventional video decoder, which performs a block access to the memory.
Figure 3:
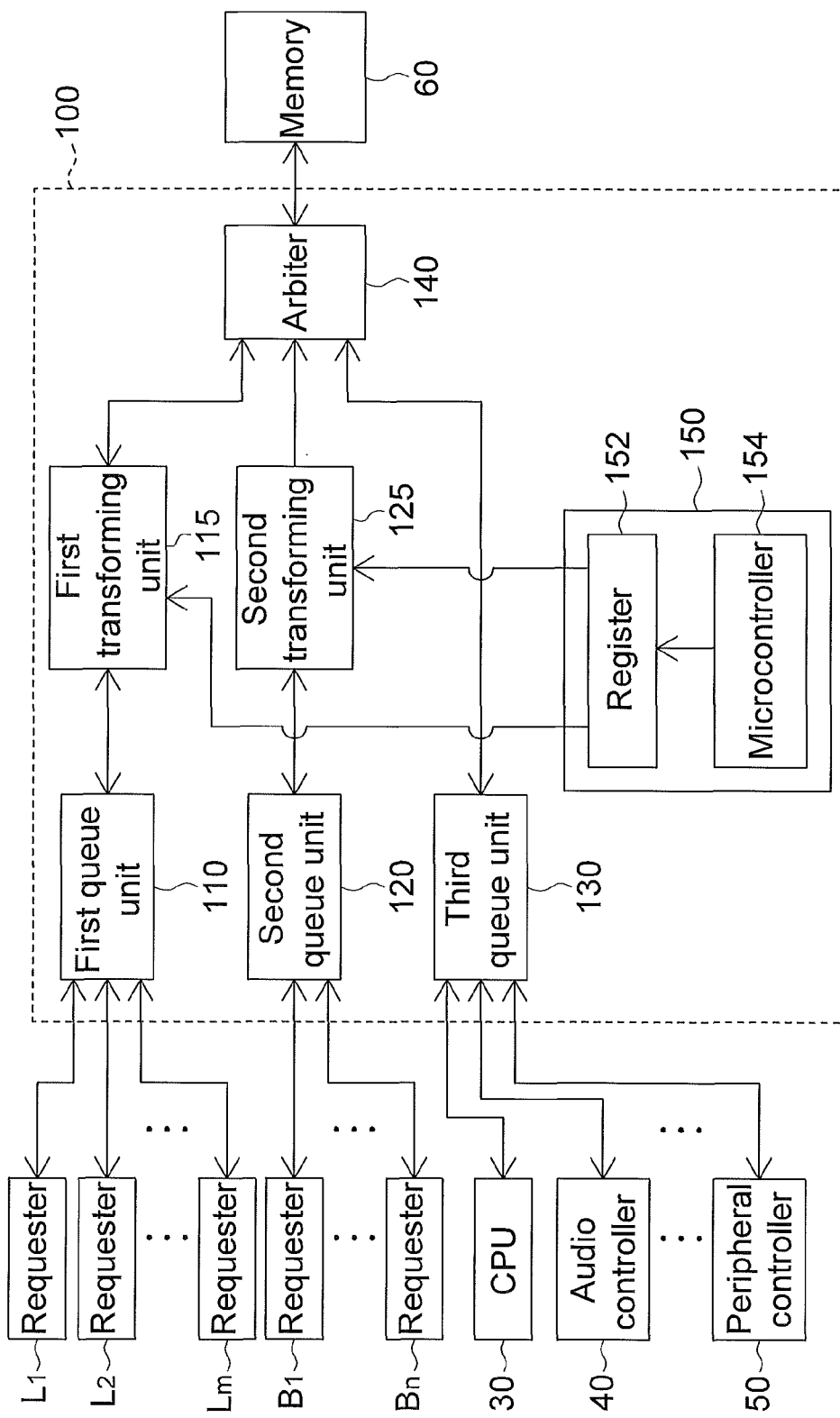
FIG. 3 is a block diagram showing a memory control system according to a preferred embodiment of the invention.

FIG. 3 is a block diagram showing a memory control system 100 according to a preferred embodiment of the invention. Referring to FIG. 3, the memory control system 100 includes a first queue unit 110, a second queue unit 120, a third queue unit 130, a first transforming unit 115, a second transforming unit 125, an arbiter 140 and a control unit 150. The first queue unit 110 temporarily stores multiple first request instructions, which correspond to a line-by-line access to a memory 60. The second queue unit 120 temporarily stores multiple second request instructions, which correspond to a block access to the memory 60. The first request instruction is, for example, a display request instruction for displaying a video frame. The second request instruction is, for example, a decoding request instruction for decoding data. However, the invention is not particularly limited thereto. The third queue unit 130 temporarily stores other types of request instructions, such as the request instructions coming from a central processing unit (CPU) 30, an audio controller 40 or a peripheral controller 50. That is, different types of request instructions are classified and temporarily stored to different queue units.

The first transforming unit 115 is coupled to the first queue unit 110 and controlled by the control unit 150 to selectively re-assign memory addresses corresponding to the first request instructions, so that the line-by-line access of the first request instructions to the memory 60 is transformed into the block access. The second transforming unit 125 is coupled to the second queue unit 120 and controlled by the control unit 150 to selectively re-assign memory addresses corresponding to the second request instructions, so that the block access of the second request instructions to the memory 60 is transformed into the line-by-line access. That is, after the second request instructions are re-assigned with the memory addresses, the addresses of the accessed data of the memory 60 are continuous.

The arbiter 140, coupled to the first transforming unit 115, the second transforming unit 125 and the third queue unit 130, performs immediate scheduling of the first request instructions of the first queue unit 110, the second request instructions of the second queue unit 120 and the other request instructions of the third queue unit 130 to the memory 60. The control unit 150 compares bandwidths of the first request instructions with bandwidths of the second request instructions, and controls the first transforming unit 115 and the second transforming unit 125 to perform re-assigning operations of the memory addresses or not according to compared results.

The control unit 150 includes a register 152 and a microcontroller 154. The register 152 is coupled to the first transforming unit 115 and the second transforming unit 125. The microcontroller 154 calculates the bandwidths of the first request instructions and the bandwidths of the second request instructions, and outputs a first control instruction to the register 152 to enable or disable the first transforming unit 115 and outputs a second control instruction to the register 152 to enable or disable the second transforming unit 125 according to calculated results. The microcontroller 154 substantially further calculates access bandwidths to the memory 60 after the first request instructions and the second request instructions are re-assigned with corresponding memory addresses.

Assume the memory control system 100 as corresponding to m line-by-line accessed requesters $L_1$ to $L_m$, and corresponding to n block accessed requesters $B_1$ to $B_n$, wherein m and n are positive integers. In addition, assume the re-assigning mechanism of the first/second request instructions for accessing, from the memory 60, the data for the display usage to be f(x), and the re-assigning mechanism of the second request instructions for accessing, from the memory 60, the data for the decoding usage to be g(x). If L(X) and B(X) respectively represent the bandwidths of the requesters of the line-by-line access and the block access, then the bandwidths of the requesters $L_1$ to $L_m$ of the line-by-line access are respectively $L(L_1)$ to $L(L_m)$, and the bandwidths of the requesters $B_1$ to $B_n$ of the block access are respectively $B(B_1)$ to $B(B_n)$.

When the microcontroller 154 judges that the bandwidths of the first request instructions exceed the bandwidths of the second request instructions by a first threshold value (i.e., the required bandwidths of the first request instructions of the line-by-line access are higher than the required bandwidths of the second request instructions of the block access), the microcontroller 154 outputs the first control instruction and the second control instruction to the register 152 to disable the first transforming unit 115 and the second transforming unit 125, respectively. At this time, the overall bandwidth BW, which is equal to $L(L_1)+L(L_2)+\ldots+L(L_m)+B(B_1)+B(B_2)+\ldots+B(B_n)$ and calculated by the microcontroller 154, has to fall within the bandwidth range that can be provided by the memory 60. The first request instructions are, for example, the display request instructions, and the second request instructions are, for example, the decoding request instructions. In this case, it represents that the required bandwidths for display (e.g., the display of the high definition video) are high, and the microcontroller 154 disables the first transforming unit 115 and the second transforming unit 125 to disable the re-assigning mechanisms f(x) and g(x) and thus to achieve the best memory bandwidth availability.

When the microcontroller 154 judges that the bandwidths of the second request instructions exceed the bandwidths of the first request instructions by a second threshold value (i.e., the required bandwidths of the second request instructions of the block access are higher than the required bandwidths of the first request instructions of the line-by-line access), the microcontroller 154 outputs the first control instruction and the second control instruction to the register 152 to enable the first transforming unit 115 and the second transforming unit 125, respectively. At this time, the dynamic adjustment bandwidth $BW_d$, which is equal to $L2B(L_1)+L2B(L_2)+\ldots+L2B(L_m)+B2L(B_1)+B2L(B)+\ldots+B2L(B)$ and calculated by the microcontroller 154, has to fall within the bandwidth range that can be provided by the memory 60. The first request instructions are, for example, the display request instructions, while the second request instructions are, for example, the decoding request instructions. In this case, it represents that the required bandwidths for display are low, and the microcontroller 154 enables the first transforming unit 115 and the second transforming unit 125 to enable the re-assigning mechanisms f(x) and g(x) and thus to achieve the best memory bandwidth availability.

When the microcontroller 154 judges that an upper bound bandwidth of the memory control system 100 is lower than a third threshold value (i.e., the bandwidth that can be provided by the memory 60 is limited), the microcontroller 154 outputs the first control instructions to disable the first transforming unit 115, and outputs the second control instructions to re-assign the memory addresses corresponding to other second request instructions, which do not correspond to the data for the display usage. If the first request instructions are the display request instructions and the second request instructions are the decoding request instructions, for example, and r represents the number of requesters, which do not correspond to the data for the display usage, then the dynamic adjustment bandwidth $BW_d$, which is equal to $L(L_1)+L(L_2)+\ldots+L(L_m)+B2L(B_1)+B2L(B_2)+\ldots+B2L(B_r)+B(B_{r+1})+\ldots+B(B_n)$ and is calculated by the microcontroller 154, needs to fall within the bandwidth range that can be provided by the memory 60. At this time, the microcontroller 154 disables the re-assigning mechanism f(x), and enables the re-assigning mechanism g(x) to achieve the best memory bandwidth availability.

In addition, the microcontroller 154 may further calculate the access bandwidth to the memory 60 after a portion of the first request instructions and a portion of the second request instructions are re-assigned with the corresponding memory addresses. If p represents the number of requesters transformed from the line-by-line access to the block access, and q represents the number of requesters transformed from the block access to the line-by-line access, then the dynamic adjustment bandwidth $BW_d$ calculated by the microcontroller 154 is equal to $L2B(L_1)+L2B(L_2)+\ldots+L2B(L_p)+L(L_{p+1})+L(L_{p+2})+\ldots+L(L_m)+B2L(B_1)+B2L(B_2)+\ldots+B2L(B_q)+B(B_{q+1})+B(B_{q+2})+\ldots+B(B_n)$. That is, the dynamic adjustment bandwidths $BW_d$ corresponding to different settings can be obtained by adjusting the values of p and q. Thus, the suitable dynamic adjustment bandwidth $BW_d$ can be provided in different product applications according to required different bandwidths of the memories by adjusting the values of p and q. Thus, the best memory bandwidth availability can be achieved, the product can be optimized and the cost can be minimized advantageously.

In addition, the invention further provides a memory control method including the following steps. First, a first queue unit is utilized to temporarily store multiple first request instructions, which correspond to a line-by-line access to a memory. Next, a second queue unit is utilized to temporarily store multiple second request instructions, which correspond to a block access to the memory. Then, an arbiter is utilized to perform immediate scheduling of the first request instructions and the second request instructions to the memory. Next, a control unit is utilized to compare bandwidths of the first request instructions with bandwidths of the second request instructions, to control a first transforming unit to selectively re-assign memory addresses corresponding to the first request instructions, and to control a second transforming unit to selectively re-assign memory addresses corresponding to the second request instructions according to compared results.

The operation principles of the memory control method have been described in the memory control system 100, so detailed descriptions thereof will be omitted.

The memory control system and method according to the embodiment of the invention have many advantages, some of which will be listed in the following.

The memory control system and method of the invention utilize the classification queue to classify different types of request instructions, so that they have individual independent address transforming mechanisms, and the address transforming mechanisms may be dynamically selected according to the requirement to provide the suitable dynamic adjustment bandwidth. Thus, the overall system performance can be optimized, the product can be optimized, and the cost can be minimized advantageously.

While the invention has been described by way of example and in terms of the preferred embodiment(s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A memory control system, comprising:
a first queue unit for temporarily storing a plurality of first request instructions, which corresponds to a line-by-line access to a memory;
a second queue unit for temporarily storing a plurality of second request instructions, which corresponds to a block access to the memory;
a first transforming unit for selectively re-assigning memory addresses corresponding to the first request instructions;
a second transforming unit for selectively re-assigning memory addresses corresponding to the second request instructions;
an arbiter, coupled to the first transforming unit and the second transforming unit, for performing immediate scheduling of the first request instructions and the second request instructions to the memory; and
a control unit for comparing bandwidths of the first request instructions with bandwidths of the second request instructions, and controlling the first transforming unit and the second transforming unit to perform re-assigning operations or not according to compared results.

2. The memory control system according to claim 1, wherein the first request instructions are a plurality of display request instructions.

3. The memory control system according to claim 1, wherein the second request instructions are a plurality of decoding request instructions.

4. The memory control system according to claim 1, wherein the first transforming unit is controlled by the control unit to selectively re-assign the memory addresses corresponding to the first request instructions, so that the line-by-line access of the first request instructions to the memory is transformed into the block access.

5. The memory control system according to claim 1, wherein the second transforming unit is controlled by the control unit to selectively re-assign the memory addresses corresponding to the second request instructions, so that the block access of the second request instructions to the memory is transformed into the line-by-line access.

6. The memory control system according to claim 1, wherein the control unit comprises:
a register, coupled to the first transforming unit and the second transforming unit; and
a microcontroller for calculating the bandwidths of the first request instructions and the bandwidths of the second request instructions, and outputting a first control instruction to the register to enable or disable the first transforming unit and outputting a second control instruction to the register to enable or disable the second transforming unit according to calculated results.

7. The memory control system according to claim 6, wherein the microcontroller further calculates access bandwidths to the memory after the first request instructions and the second request instructions are re-assigned with corresponding memory addresses.

8. The memory control system according to claim 6, wherein when the microcontroller judges that the bandwidths of the first request instructions exceed the bandwidths of the second request instructions by a first threshold value, the microcontroller outputs the first control instruction and the second control instruction to respectively disable the first transforming unit and the second transforming unit.

9. The memory control system according to claim 6, wherein when the microcontroller judges that the bandwidths of the second request instructions exceed the bandwidths of the first request instructions by a second threshold value, the microcontroller outputs the first control instruction and the second control instruction to respectively enable the first transforming unit and the second transforming unit.

10. The memory control system according to claim 6, wherein:
- data accessed from the memory according to a portion of the second request instructions are for a display usage; and
- when an upper bound bandwidth of the memory control system is lower than a third threshold value, the microcontroller outputs the first control instruction to disable the first transforming unit, and outputs the second control instruction to re-assign memory addresses corresponding to the other portion of the second request instructions, which does not correspond to the data for the display usage.

11. A memory control method, comprising the steps of:
- utilizing a first queue unit to temporarily store a plurality of first request instructions, which corresponds to a line-by-line access to a memory;
- utilizing a second queue unit to temporarily store a plurality of second request instructions, which corresponds to a block access to the memory;
- utilizing an arbiter to perform immediate scheduling of the first request instructions and the second request instructions to the memory; and
- utilizing a control unit to compare bandwidths of the first request instructions with bandwidths of the second request instructions, to control a first transforming unit to selectively re-assign memory addresses corresponding to the first request instructions, and to control a second transforming unit to selectively re-assign memory addresses corresponding to the second request instructions according to compared results.

12. The method according to claim 11, wherein the first request instructions are a plurality of display request instructions.

13. The method according to claim 11, wherein the second request instructions are a plurality of decoding request instructions.

14. The method according to claim 11, further comprising the step of:
- utilizing the control unit to control the first transforming unit to selectively re-assign the memory addresses corresponding to the first request instructions, so that the line-by-line access of the first request instructions to the memory is transformed into the block access.

15. The method according to claim 11, further comprising the step of:
- utilizing the control unit to control the second transforming unit to selectively re-assign the memory addresses corresponding to the second request instructions, so that the block access of the second request instructions to the memory is transformed into the line-by-line access.

16. The method according to claim 11, wherein the control unit comprises a register and a microcontroller, and the memory control method further comprises the step of:
- utilizing the microcontroller to calculate the bandwidths of the first request instructions and the bandwidths of the second request instructions, and to output a first control instruction to the register to enable or disable the first transforming unit and output a second control instruction to the register to enable or disable the second transforming unit according to calculated results.

17. The method according to claim 16, further comprising the steps of:
- utilizing the microcontroller to calculate access bandwidths to the memory after the first request instructions and the second request instructions are re-assigned with corresponding memory addresses.

18. The method according to claim 16, further comprising the step of:
- utilizing the microcontroller to output the first control instruction and the second control instruction to respectively disable the first transforming unit and the second transforming unit when the bandwidths of the first request instructions exceed the bandwidths of the second request instructions by a first threshold value.

19. The method according to claim 16, further comprising the step of:
- utilizing the microcontroller to output the first control instruction and the second control instruction to respectively enable the first transforming unit and the second transforming unit when the bandwidths of the second request instructions exceed the bandwidths of the first request instructions by a second threshold value.

20. The method according to claim 16, wherein data accessed from the memory according to a portion of the second request instructions are for a display usage, and the memory control method further comprises the step of:
- utilizing the microcontroller to output the first control instruction to disable the first transforming unit, and output the second control instruction to re-assign memory addresses corresponding to the other portion of the second request instructions, which does not correspond to the data for the display usage when an upper bound bandwidth is lower than a third threshold value.

* * * * *